Dec. 5, 1944.   H. MONROE   2,364,463
EAR TAG FOR ANIMALS
Filed Dec. 17, 1943

Inventor
Horace Monroe

By Clarence A. O'Brien
and Harvey B. Jacobson
Attorneys

Patented Dec. 5, 1944

2,364,463

UNITED STATES PATENT OFFICE 2,364,463

EAR TAG FOR ANIMALS

Horace Monroe, Scipio, Utah

Application December 17, 1943, Serial No. 514,687

1 Claim. (Cl. 40—3)

My invention relates to improvements in ear tags for animals, the principal object in view being to provide an inexpensive, securely locked device of this character which is easy to apply and is equipped with a removable identification element which may be expeditiously replaced by another element identifying the animal differently and when desired.

To the accomplishment of the above, and subordinate objects presently appearing, a preferred embodiment of my invention has been illustrated in the accompanying drawing, set forth in detail in the succeeding description, and defined in the claim appended hereto.

Figure 1:
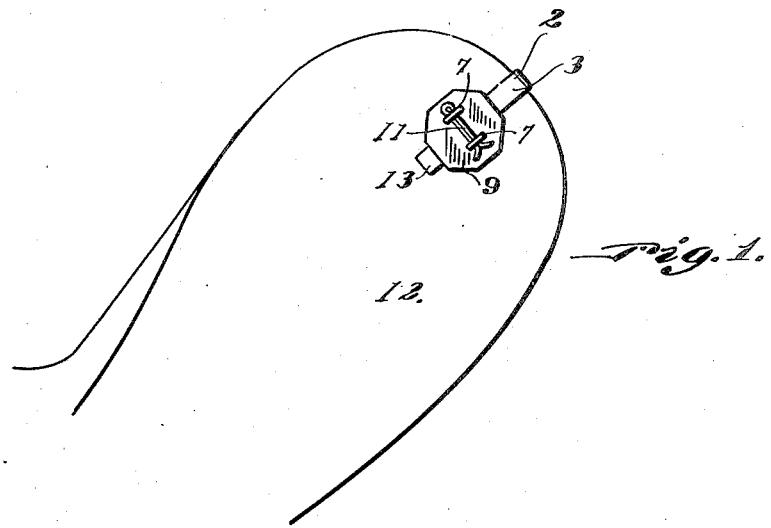
Figure 1 is a view in elevation illustrating my improved ear tag applied.
Figure 2:
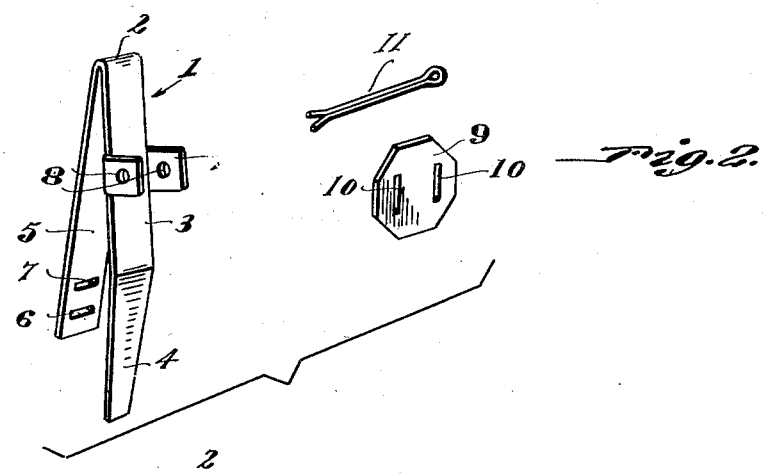
Figure 2 is a disassembled view with the parts shown in perspective.

Referring to the drawing by numerals, my improved ear tag, as shown, comprises a flat strip 1 of bendable metal, such as steel, bent upon itself intermediate its ends, as at 2, to provide a long leg 3 terminating in a tapered end section 4, and a relatively shorter leg 5 provided adjacent its free end with a pair of transversely extending slots 6, 7, respectively, spaced apart longitudinally of said shorter leg. A pair of opposed, outstanding lugs 7 are provided on the long leg 3 intermediate the bend 2 and the end section 4 to extend from opposite side edges of said leg, said lugs being centrally apertured, respectively, as at 8. A flat, identification button 9 of any suitable, inexpensive material, such as plastic, metal, or the like, is provided for attachment to the lugs 7 and detachment therefrom, and to that end said button is provided with a pair of slots 10 therein dimensioned to fit over the lugs 7 so that the button may be attached flat against the longer leg 3 on the outer side thereof. A cotter pin 11 extended through the apertures 8, across the face of the button 9, secures said button in place. The button 9 may be provided on its face, and also on its rear side, with any desired insignia, or symbols, not shown, for identifying the animal to which the tag is attached.

Figure 3:
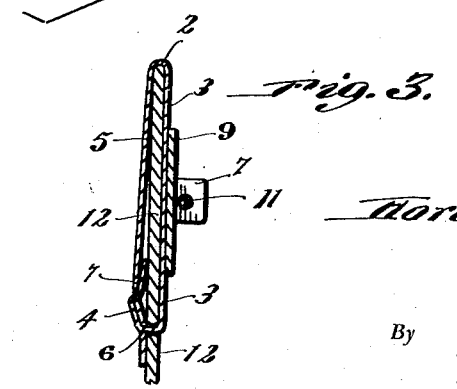
Figure 3 is a view in section taken on the line 3—3 of Figure 1 and drawn to an enlarged scale.

In attaching the described tag, the legs 3, 5 are positioned over the tip of the ear 12 of an animal to be tagged in straddling relation to the ear, and with a shorter leg 5 at the back of the ear. The end section 4 is then passed rearwardly through a slit 13 in the ear 12, extended through the slot 6 nearest the free end of the shorter leg 5, bent upwardly behind the shorter leg 5 and then inserted forwardly through the other slot 7 with its tip disposed flat against said leg 5 between the latter and the ear 12 of the animal, all as shown in Figure 3. In this manner, the tag is securely locked to the animal's ear. Manifestly, the button 9 may be detached and replaced with another one bearing different identification data easily and quickly, whenever desired, and/or the button may be reversed on the lugs 7 should occasion require.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

An ear tag for animals comprising a strip of flat metal bent upon itself intermediate its ends and including a pair of opposed long and short legs, respectively, the short leg having a pair of longitudinally spaced, transversely extending slots therein adjacent the free end thereof and the long leg having a tapered terminal section extended through said slots, whereby said legs are locked together, an identification button, and means to detachably attach said button to one of said legs flat against the same comprising a pair of opposed, centrally apertured lugs on said one leg, the button having slots therein fitting over said lugs, and a cotter pin extended through said apertures across said button.

HORACE MONROE.